United States Patent
Illetschko et al.

[11] 3,946,152
[45] Mar. 23, 1976

[54] CORRECTION SYSTEM FOR VIDEO SIGNALS HAVING A LIMITED AMPLITUDE RANGE

[76] Inventors: Gerhard Illetschko, Liebigstr. 51, 61 Darmstadt; Horst Peth, Jugenheimer Str. 49, 6246 Alsbach, both of Germany

[22] Filed: Feb. 25, 1974

[21] Appl. No.: 445,776

[30] Foreign Application Priority Data
Feb. 28, 1973 Germany............................ 2309884

[52] U.S. Cl.............................. 178/7.1; 178/DIG. 25
[51] Int. Cl.² ............................................. H04N 3/16
[58] Field of Search....... 178/DIG. 25, 7.1, DIG. 34; 358/37

[56] References Cited
UNITED STATES PATENTS

| | | | |
|---|---|---|---|
| 2,939,910 | 6/1960 | Blake | 178/DIG. 25 |
| 3,444,318 | 5/1969 | Monteath | 178/DIG. 25 |

*Primary Examiner*—Robert L. Griffin
*Assistant Examiner*—R. John Godfrey
*Attorney, Agent, or Firm*—Michael J. Striker

[57] ABSTRACT

The video signals are applied to a standard aperture correction circuit and also to a non-linear circuit. The output of the non-linear circuit and the output of the standard aperture correction circuit are applied to the two inputs of a modulator whose output is combined in a summing circuit with video signals delayed by a time delay corresponding to the time delay in the non-linear circuit and modulator. In a preferred embodiment the non-linear transfer function corresponds to $A^2-A$ and is achieved by a double-balanced modulator the DC level at whose inputs is adjusted to yield the desired transfer function.

7 Claims, 4 Drawing Figures

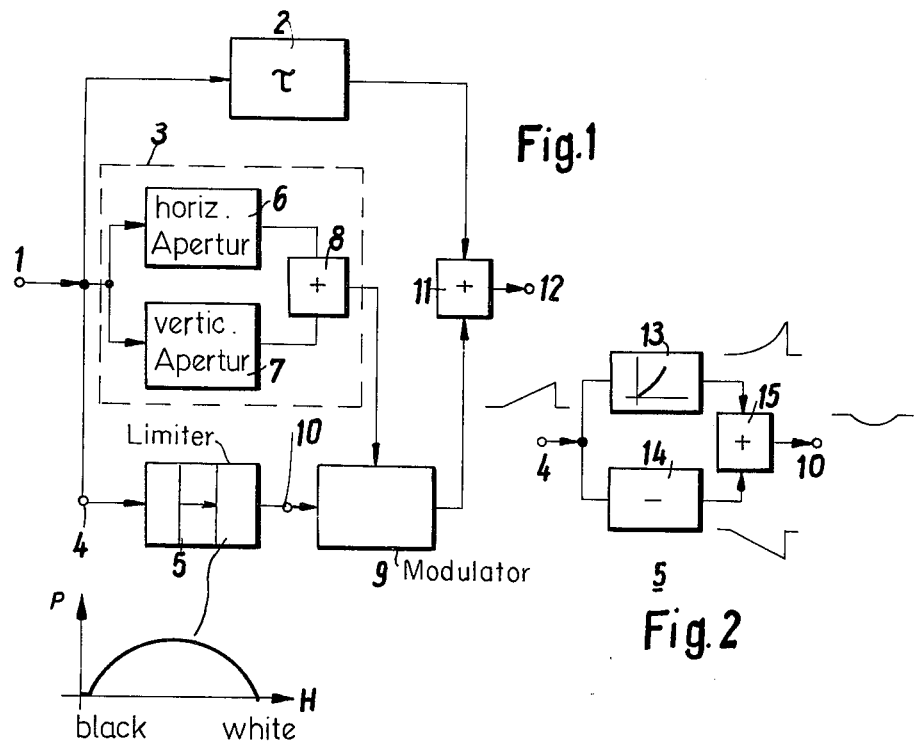
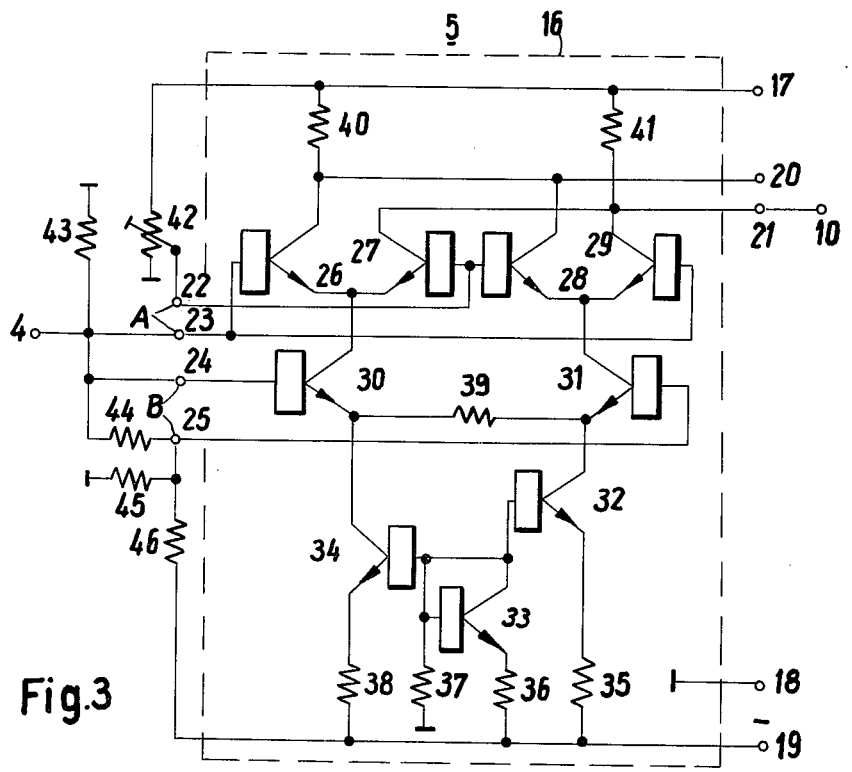

CORRECTION SYSTEM FOR VIDEO SIGNALS HAVING A LIMITED AMPLITUDE RANGE

BACKGROUND OF THE INVENTION

The present invention relates to a system for correcting video signals having a limited amplitude range, wherein the correction signal is to be combined with the video signals to be corrected.

The present invention relates specifically to aperture correction circuits wherein errors arising both on the transmitting and the receiving side are to be eliminated or greatly reduced. A standard aperture correction of video signals generally comprises a correction for errors arising from distortion of the video signals as a result of the finite size and lack of uniformity in the impingement of the scanning dot both on the signal electrode on the pick-up side as well as on the screen on the receiving side. In known aperture correction circuits, an optimum visual correction is carried out only for the portions of the video signal having a medium brightness. This results in an overdriving of the circuits in response to sudden amplitude changes in the video signal. This in turn results in a widening of the discontinuity and a resultant loss of picture quality. In order to eliminate these particular correction errors and others, it has been suggested that the correction signal should be modulated as a function of video signal amplitude prior to heterodyning with the video signal in such a manner that overdriving of the heterodyned signal into the blacker than black or whiter than white region is eliminated.

One known system of the above-described type is shown in FIG. 2 of U.S. Pat. No. 3,536,826. The system shown there is a system for vertical aperture correction. As becomes evident from the description of this known circuit, only the oscillations due to overdriving in the heterodyned video signal are limited. A substantial amount of circuitry is required to achieve this purpose. No correction takes place between the video signal amplitude levels of 0% (black) and 100% (white). Thus with the known circuit arrangement, the amplitude range of the video signal can be selected and the vertical correction signal is cut off at the limits of this signal.

SUMMARY OF THE INVENTION

It is an object of the present invention to overcome the disadvantages of the known circuits and to furnish a system for correcting video signals having a determined amplitude range both with respect to vertical and horizontal aperture correction and by means of reduced circuitry relative to the known systems.

In accordance with the present invention, video signals are applied to a standard aperture correction means which furnishes aperture correction signals at an aperture correction output. The video signals are also applied to non-linear circuit means having a non-linear transfer characteristic and an output for furnishing a modified video signal. Modulator means have a first input connected to the output of said aperture correction means and a second input connected to the output of said non-linear circuit means and furnish a modulated signal corresponding to the signals applied at said first and second inputs at a modulator output. Delay circuit means are provided for delaying the incoming video signals for a determined time interval corresponding to the delay introduced by said non-linear circuit means and said modulator means. A summing circuit is provided having a first input connected to the output of said delay circuit means, a second input connected to said modulator output and a summing amplifier output for furnishing a corrected video signal.

In a preferred embodiment of the present invention, the non-linear circuit means further operate to surpress signals having an amplitude within a determined amplitude range of the amplitude representative of signal black. This causes a complete surpression of noise components in this region.

The system of the present invention has the advantage that the correction signals affect not only the amplitude range of the video signals but also the signals of intermediate amplitude. The transfer function P of the non-linear circuit means in a preferred embodiment of the present invention corresponds to $P=A^2-A$, where $A$ is the amplitude of the video signal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a block diagram of the system of the present invention;

FIG. 2 is a block diagram for a first preferred embodiment of the non-linear circuit means;

FIG. 3 is a circuit diagram of a second preferred embodiment of the non-linear circuit means.

DESCRIPTION OF THE PREFERRED EMBODIMENTS

Figure 4:
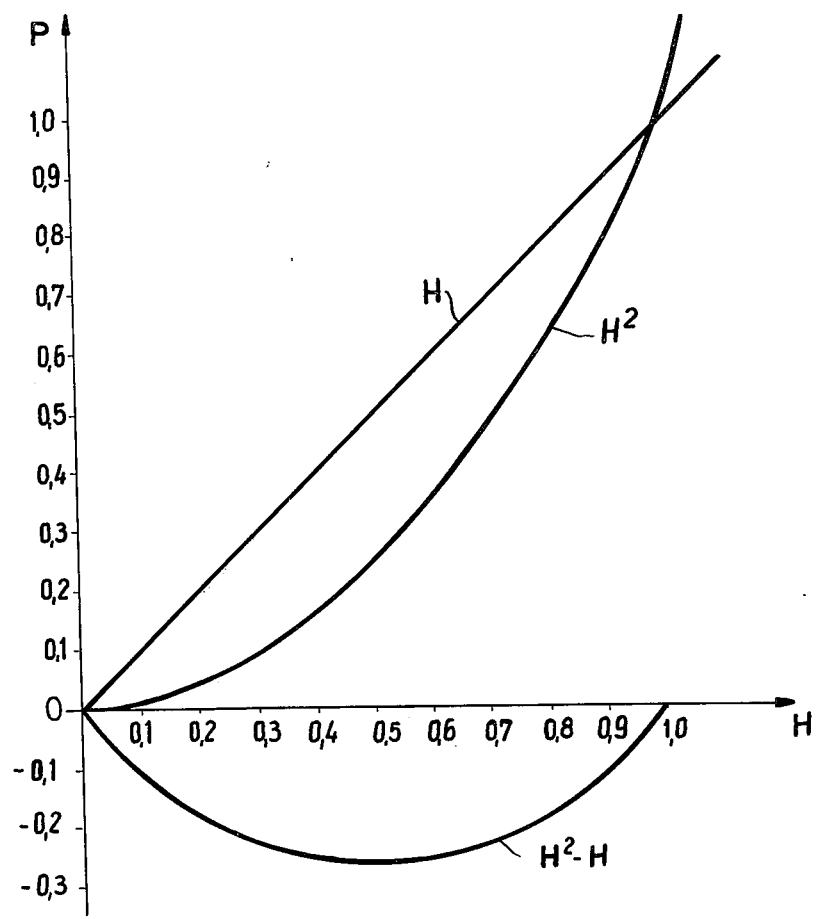
FIG. 4 shows the transfer function of the non-linear circuit means of FIG. 3 as a function of the amplitude of the applied video signals.

A preferred embodiment of the present invention will now be described with reference to the drawing.

In FIG. 1 the video signal is received at terminal 1 and is applied to delay circuit means 2, a standard aperture correction circuit 3, and via terminal 4, to non-linear circuit means 5. The aperture correction means 3, in the embodiment of FIG. 1, comprise a horizontal aperture correction circuit 6 as well as a vertical aperture correction circuit 7. The correction signals furnished by the two standard aperture correction circuits are combined in a summing stage 8. This type of aperture correction circuit may be found in U.S. Pat. No. 2,922,965. The signal at the output of summing stage 8 is applied to the first input of a modulator stage 9. The second input of the modulator stage 9 is connected via a terminal 10 to the output of the non-linear circuit means 5. The non-linear circuit means 5 have a transfer characteristic shown in the diagram which forms a part of FIG. 1. The ordinate therein is the amplification factor of stage 5, while the abscissa corresponds to the amplitude values with the black level being at minimum amplitude and the white level at maximum amplitude. It will be noted that signal amplitudes which lie in the black or white region are not amplified, while amplitudes which correspond to a medium picture brightness are maximally amplified. The so modulated video signals at the output of stage 5 are applied through a limiter stage 5a (unless the limiting is carried out in stage 5 as will be described below) to a terminal 10 which serves as the second input of a modulator stage 9. Modulator stage 9 is a well known amplitude modulator. The resulting modulated signal at the modulator output is furnished to one terminal of a summing stage 11 at whose other input is applied the output of a delay circuit 2. The inputs to the delay circuit 2 are the video signals. The reason for delay circuit 2 is that the correction stages delays the video signals by a determined time delay which is compensated for by stage 2. A corrected video signal then appears at the output 12 of summing stage 11.

FIG. 2 shows a preferred embodiment of the non-linear circuit means 5. The video signals at terminal 4 are simultaneously applied to the input of an inverter stage 14 which inverts the polarity of said video signals and a stage 13 which has a parabolic transfer characteristic. The output of stages 13 and 14 are applied to the first and second input of a summing stage 15 at whose output is furnished the modified video signal. A sawtooth signal as shown in FIG. 2 is applied at terminal 4, and causes the signals pictured at the outputs of stages 13 and 14 to be generated, whose sum results in the signal pictured at terminal 10. It will be noted that the signal at terminal 10 has an amplitude characteristic corresponding to the function $A^2 - A$. With an appropriate threshold of the amplitude characteristic it is possible to suppress signals having a small amplitude, that is signals in the black region. Alternatively, in a preferred embodiment of the present invention, the signal furnished at the output of stage 15 can be put through a limiter stage 5a prior to application to terminal 10.

FIG. 3 shows a second preferred embodiment for non-linear stage 5. Enclosed in dash lines is a circuit 16 which is a known integrated circuit of a double-balanced modulator. In this integrated circuit, terminals 17, 18 and 19 are used to apply the operating voltage. The output signal may be derived at terminals 20 or 21, the latter of which is shown to be directly connected to terminal 10. Terminals 22 and 23 serve as input terminals for a first signal, while terminals 24 and 25 serve as input terminals for a second signal. The first and second signals are herein referred to as signal A and signal B respectively.

Modulator 16 as shown in the Figure has two pairs of transistors namely transistors 26 and 27 and transistors 28 and 29. An input transistor 30 is connected to transistors 26 and 27, while an input transistor 31 is connected to transistors 28 and 29. Transistors 32, 33 and 34 in association with resistors 35–38 serve as a constant current source. The emitters of transistors 30 and 31 are connected to each other through a resistor 39 in such a manner that a differential amplifier type of operation results. A resistor 40 serves as a load resistor for transistors 26 and 28, while a resistor 41 serves as load resistor for transistors 27 and 29. The modified video signals are available at resistors 40 and 41. The signals derived from terminal 20 will have the inverse polarity as those derived from terminal 21.

Under normal operation in this type of circuit, the modulating signal B is applied at terminals 24 and 25, while a carrier signal A is applied at terminals 22 and 23. Carrier signal A switches transistors 26 and 29 to the conductive state, while simultaneously switching transistors 27 and 28 to the non-conductive state in a first half period. In the subsequent half period, transistors 26 and 29 are blocked, while transistors 27 and 28 are switched to the conductive state. This process repeats in each period of the carrier signal so that transistors 26, 27 and 28, 29 alternately become conductive. This alternate symmetrical and synchronous control of transistors 26 – 29 causes signals applied inversely at the bases of transistors 30 and 31 a modulated signal which suppressed carrier to be developed across collector resistors 40 and 41.

This type of operation is a multiplicative processing of two signals in which in general it is desired that only the product of the two signals appear at the output. If now a signal A is applied to the first input (terminals 22 and 23) and a signal B is applied to the second input (terminals 24 and 25) then the signal at terminal 10 is not one of the two signals A or B, but the product $P = k \times A \times B$ where $k$ is a constant amplification factor. However, this product results only if terminals 22 and 23 and terminals 24 and 25 are at the same DC level. If the DC voltage balance at terminals 24 and 25 or 22 and 23 is disturbed, then an additive or subtractive component of B and/or signal A can result. In general, the signal at terminal 10 is a signal which corresponds to the equation $P = k_1 \times A \times B \mp k_2 \times A \mp k_3 \times B$. If the DC potential at terminals 24 and 25 is equal $k_2$ becomes zero, while an equal DC potential at terminals 22 and 23 results in $k_3$ becoming zero. Of particular importance for the present application is the case where signal at A is equal to signal B and $k_3$ is equal to zero, so that the modulator transfer function is equal to $$P = k_1 \times A^2 \pm k_2 \times A$$

If $k_1 = k_2 = 1$, the transfer function of the modulator is seen to be $P = A^2 - A$.

The functioning of circuit of FIG. 3 is illustrated in FIG. 4. In this Figure the abcissa corresponds to video signal amplitude or brightness, while the ordinate represents the transfer function P of stage 5 as shown in FIG. 3. If potentiometer 42 is so adjusted that terminals 22 and 23 are at the same DC potential, then a quadratic function results, namely $P = H^2$. Resistor 43 serves to set the operating points of transistors 26 and 29. Changing the DC potential at terminal 22 by means of potentiometer 42 towards the positive potential 17, causes an unbalance of the circuit of FIG. 3 so that a subtractive portion of the signal appears at terminal 10. The amplitude of this portion depends upon the amplitude of the difference in DC potential at terminals 22 and 23. Since the signal applied at terminals 22 and 23, and 24 and 25, respectively, is identical for purposes of the present invention, the same results can be achieved by creating a potential difference between terminals 24 and 25 by changing resistors 44 to 46 which serve as voltage dividers.

In a further preferred embodiment of the present invention, modulator stage 9 is also embodied in a circuit 16 as shown in FIG. 3. For this stage, i.e. for the circuit of FIG. 3 serving as modulator 9, the signal A applied at terminals 22 to 23 is the signal derived from summing stage 8, while the signal derived from terminal 10 serves as input at terminals 24, 25.

While the invention has been illustrated and described as embodied in utilizing particular forms of non-linear circuits, it is not intended to be limited to the details shown, since various circuit and structural changes may be made without departing in any way from the spirit of the present invention.

Without further analysis, the foregoing will so fully reveal the gist of the present invention that other can by applying current knowledge readily adapt it for various applications without omitting features that, from the standpoint of prior art fairly constitute essential characteristics of the generic or specific aspects of this invention and, therefore such adaptations should and are intended to be comprehended within the meaning and range of equivalence of the following claims.

What is claimed as new and desired to be protected by Letters Patent is set forth in the appended:

1. In an aperture correction system including aperture correction means having an input for receiving video signals and an output for furnishing aperture correction signals varying as a function of said video signals, an additional correction system comprising, in combination, non-linear circuit means having an input for receiving said video signals, a non-linear transfer characteristic, and an output, for furnishing a modified video signal varying as a function of said video signals and said non-linear transfer characteristic at said output; modulator means having a first input connected to said output of said aperture correction means, a second input connected to said output of said non-linear circuit means and a modulator output, for furnishing a modulator signal corresponding to signals applied at said first and second inputs at said modulator output; and summing circuit means having a first input for receiving said video signals, a second input connected to said modulator output, and a summing output, for furnishing corrected video signals corresponding to the sum of the signals at said first and second inputs at said summing output.

2. A system as set forth in claim 1, wherein said non-linear circuit means and said modulator means delay said video signals by a determined time delay; further comprising delay circuit means having an input connected to receive said video signals and an output connected to said first input of said summing circuit means, for furnishing delayed video signals corresponding to said video signals delayed by said determined time delay to said first input of said summing circuit means.

3. A system as set forth in claim 2, wherein said transfer function corresponds to the difference between the amplitude of said video signals and the square of said amplitude.

4. A system as set forth in claim 1, wherein said video signals have a first determined amplitude signifying picture black and a second determined amplitude signifying picture white; further comprising limiter circuit means connected to said output of said non-linear circuit means for surpressing modified video signals having an amplitude within a determined amplitude range of said first determined amplitude.

5. A system as set forth in claim 1, wherein said non-linear circuit means comprise an inverter stage having an input connected to said input of said non-linear circuit means; a second stage having a parabolic transfer function connected to said input of said non-linear circuit means; and a summing circuit having a first input connected to the output of said inverter stage, a second input connected to the output of said second stage and a summing circuit output constituting said output of said non-linear circuit means.

6. A system as set forth in claim 1, wherein said non-linear circuit means comprise a double-balanced modulator having a first and second pair of transistors, each transistor in said pairs of transistors having a base, a first and second control input terminal respectively connected to corresponding ones of said bases of said first and second pair of transistors, a first and second input transistor respectively connected to said first and second pair of transistors, each of said input transistors having a base; and means for adjusting the DC level of said first and second control input terminals in such a manner that the output of said double-balanced modulator corresponds to a determined non-linear function of the input to said double-balanced modulator.

7. A system as set forth in claim 6, wherein said determined non-linear function is a function corresponding to the difference between the square of the amplitude of signals applied at said modulator input and the amplitude of said signals.

* * * * *